US006033009A

United States Patent [19]

Ritter et al.

[11] Patent Number: 6,033,009

[45] Date of Patent: Mar. 7, 2000

[54] METHOD FOR CONTROLLING AN OPENABLE FOLDING TOP WITH A LOCKING DEVICE

[75] Inventors: Bernhard Ritter, Pforzheim; Hans-Dieter Dahmen, Neuhausen, both of Germany

[73] Assignee: Dr. Ing. h.c.F. Porsche AG, Germany

[21] Appl. No.: 09/262,020

[22] Filed: Mar. 4, 1999

[51] Int. Cl.[7] .......................................................... B60J 7/08

[52] U.S. Cl. ....................................... 296/121; 292/DIG. 5

[58] Field of Search ........................ 296/121; 292/DIG. 5

[56] References Cited

U.S. PATENT DOCUMENTS

| | | | |
|---|---|---|---|
| 5,284,378 | 2/1994 | Sautter | 296/121 |
| 5,636,894 | 6/1997 | Kinnanen | 296/121 |

*Primary Examiner*—Gary C. Hoge
*Attorney, Agent, or Firm*—Evenson McKeown Edwards Lenahan P.L.L.C.

[57] ABSTRACT

A method controls opening of a folding top of a vehicle. The folding top is openable and closable in a power-operated manner, and a locking device is provided for the releasable connection of the folding top with a windshield frame. The position of the locking device is optimized during a movement of the folding top by operating the locking device so that it is in its locked condition in the open as well as in the closed position of the folding top.

3 Claims, 2 Drawing Sheets

5
2
7
14
13
15
A
6
16
B 2
15
6
13
A
B
14
16
5
7

METHOD FOR CONTROLLING AN OPENABLE FOLDING TOP WITH A LOCKING DEVICE

CROSS-REFERENCE TO RELATED APPLICATION

This application is a related to U.S. application Ser. No. 09/262,021 filed on Mar. 4, 1999, entitled METHOD FOR CONTROLLING A FOLDING TOP AND COVERING USING A SUPERIMPOSED MOVEMENT, and filed in the name of Bernhard Ritter and Hans-Dieter Dahmen.

BACKGROUND OF THE INVENTION

This application claims the priority of German application 198 09 061.7, filed Mar. 4, 1998 in Germany, the disclosure of which is expressly incorporated by reference herein.

The present invention relates to a method for controlling a folding top of a vehicle to be opened, and more particularly to a method in which the folding top is openable and closable in a power-operated manner and a locking device is provided for the releasable connection of the folding top with a windshield frame.

Known methods for controlling a folding top first open a locking device for the releasable connection of the folding top with a windshield frame and subsequently open the folding top until the folding top is deposited in its open end position.

SUMMARY OF THE INVENTION

An object of the present invention is to provide a method for controlling a folding top to be opened, in which the position of the locking device is optimized during a movement of the folding top.

According to the invention, this object has been achieved by providing that the locking device is in a locked condition in the opened as well as in the closed position of the folding top. It is a feature of the present invention that the locking device be operated such that it is in its locked condition in the opened as well as in the closed position of the folding top. This ensures that the locking device will also be in its locked position when the folding top is in its open position. It is thus advantageously excluded that the parts of the locking device, such as a locking hook, which are used for the connection with the windshield frame, in the open position of the folding top, come in contact with other objects in their surroundings and grip or contaminate these.

Thus, for a sequence for opening the folding top, the locking device already is relocked when the folding top has reached its defined (opening) position. Furthermore, for the closing operation of the folding top, the locking device is kept locked until the folding top has reached a defined (closing) position. Both sequences are based on the concept of keeping the locking device open only as long as required for the actual locking or unlocking condition of the folding top with the windshield frame.

Other objects, advantages and novel features of the present invention will become apparent from the following detailed description of the invention when considered in conjunction with the accompanying drawings.

DETAILED DESCRIPTION OF THE DRAWINGS

Figure 1:
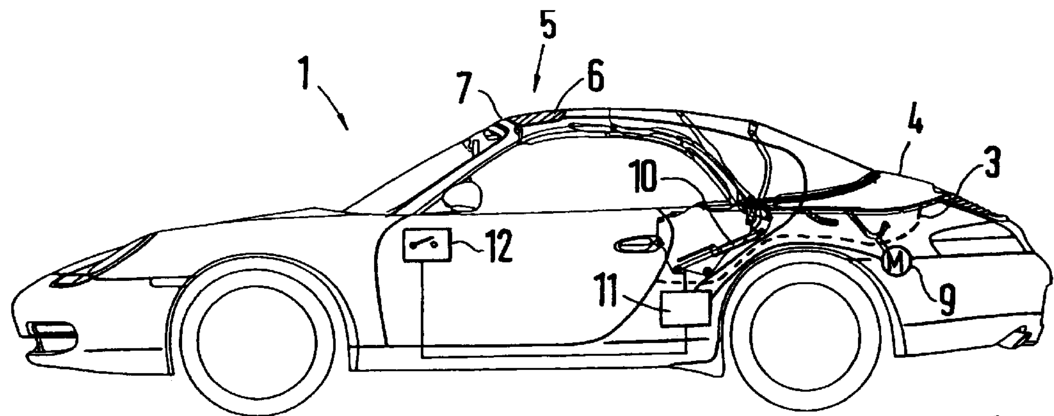
FIG. 1 is a side view of a vehicle with a closed folding top to be opened in accordance with the present invention.

The vehicle 1 illustrated in FIG. 1 has a folding top 2 which can be opened from the closed condition shown in FIG. 1 and can be deposited in a folding top compartment 3. The folding top compartment 3 can be closed by a lid 4. A forward end 5 of the folding top 2 is releasably fastened by a locking device 6 to a windshield frame 7 of the vehicle 1. In addition, a first driving device 9 is used for driving the lid 4 and a second driving device 10 is used for driving the folding top 2. As also the locking device 8, both driving devices 9, 10 can be controlled independently of one another by a control unit 11. The control unit 11 is activated by a switch 12 provided in the interior of the vehicle, by way of which a driver of the vehicle 1 can selectively trigger the opening and closing of the folding top 2.

In addition to the signal of the switch 12, the control unit 11 obtains signals concerning the position of the folding top 2 and of the lid 4 from sensors which are arranged on the driving devices 9, 10. In addition, the locking device 6 supplies a signal concerning its locking condition and additionally a signal which indicates whether the forward end 5 is situated within a distance from the folding top frame 7 which allows the locking device 6 to grip the forward end 5 of the folding top 2.

Figure 4:
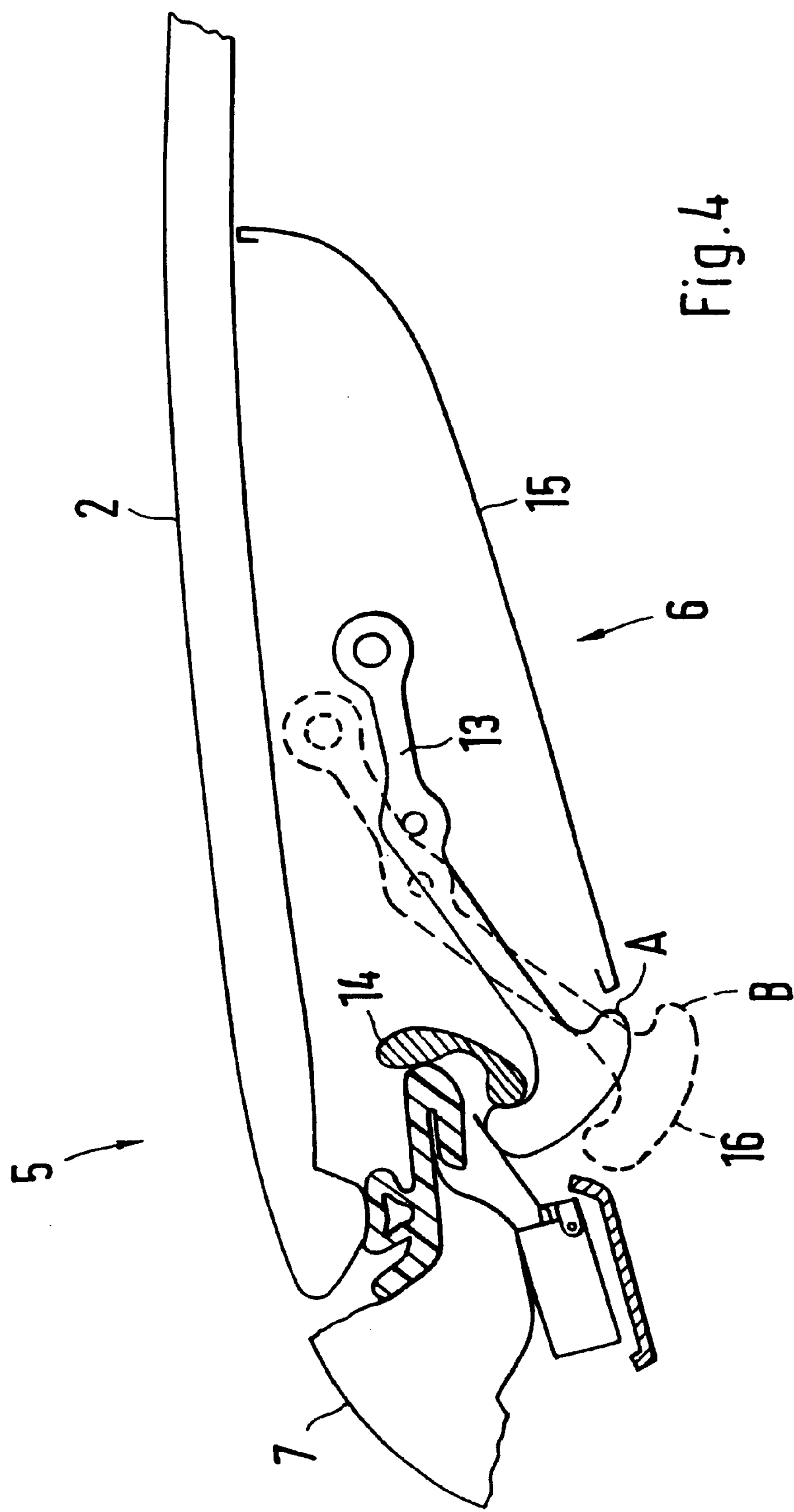
FIG. 4 is a sectional view of a locking device arranged on the folding top.

FIG. 4 is a sectional view of the locking device 6 which, in the illustrated position, engages with the windshield frame 7. On the folding top side, the locking device 6 is provided with a driven locking hook 13 so as to be moved from a locking position A illustrated by a solid line into a open position B (shown by a broken line). A hook receiving device 14 is provided on the folding top frame 7 which corresponds to the locking hook 13.

During the locking movement of the locking hook 13 from its open position B into the locking position A, the locking hook 13 reaches behind the hook receiving device 14 because of its moving path. In order to be able to also engage the locking hook 13 when the forward end 5 of the folding top 2 is at a comparatively large distance from the windshield frame 7, the open position B of the locking hook 13 is clearly selected outside the housing 15. Therefore, in its open position B, the locking hook 13 clearly projects beyond the housing 15 so that surrounding objects can catch mainly on a head 16 of the locking hook 13 and may thus become dirty or may even be damaged.

Figure 2:
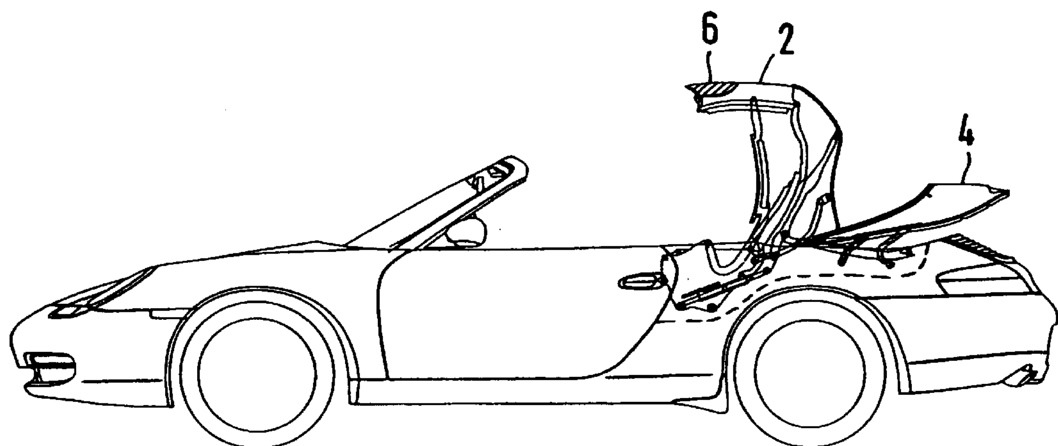
FIG. 2 is a side view of the same vehicle shown in FIG. 1, in which the folding top is in a half-opened condition.
Figure 3:
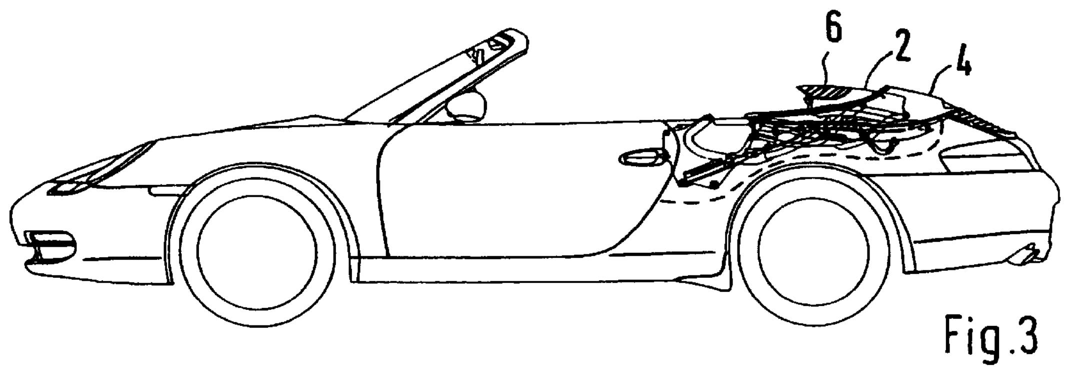
FIG. 3 is a side view of the same vehicle shown in FIG. 1, in which the folding top is in its fully open condition.

The control device 11 therefore operates the locking device 6 as follows: Starting from the condition according to FIG. 1, the locking device 6 is unlocked, i.e., the locking hook 13 is changed from position A to position B. If the locking device 6 is completely open, the driving devices 9, 10 are controlled for opening the folding top. In a half-open position of the folding top 2, for example, in the position illustrated in FIG. 2, the control unit 22 operates the locking device 6 again in the sense of a closing so that the locking hook 13 takes up position A again and therefore closes off essentially flush with the housing 15. The locking hook is in position A even when the folding top 2 is completely open as seen in FIG. 3.

A closing operation of the folding top 2 takes place in a reverse sequence. That is, the folding top 2 is moved from the completely open position shown in FIG. 3, via the half-closed position in FIG. 2, to the completely closed position shown in FIG. 1. At the start of the moving operation (FIG. 3), the locking hook 13 is in position A and remains in this position until the folding top 2 takes up the central position in FIG. 2. In this position of the folding top 2, the control unit 11 operates to open the latching hook 13 of the locking device 6. Locking hook 13, as a result, is moved into position B. When the second driving device 10 has reached its end position, the forward end 5 of the folding top 2 is situated in the area of the windshield frame 7. The control unit 11 now operates the locking device 6 in the sense of a closing and the locking hook 13 moves from position B into position A. On this moving path, the latching hook 13 reaches behind the hook receiving device 14 and, as a result of this movement, pulls the forward end 5 of the folding top 2 against the windshield frame 7 until the folding top 2 is completely closed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling opening and closing a folding top of a vehicle, the folding top being openable and closable in a power-operated manner and a locking device being provided for the releasable connection of the folding top with a windshield frame, comprising the step of operating the locking device such that it is in a locked condition in the opened as well as in the closed position of the folding top.

2. The method according to claim 1, wherein the opening step comprises the locking device is unlocked, an opening operation of the folding top is triggered, and the locking device is locked when the folding top has reached a first defined position from the windshield frame.

3. The method according to claim 1, wherein the closing step comprises triggering closing operation of the folding top, unlocking the locking device when the folding top has reached a second defined position from the windshield frame, and locking the locking device when the folding top has reached a closed position thereof.

* * * * *